(No Model.)

G. S. PEARSON.
LACING HOOK OR STUD FOR SHOES, GLOVES, &c.

No. 525,718. Patented Sept. 11, 1894.

WITNESSES
H. A. Lantz
S. V. Richardson

INVENTOR
George S. Pearson
By A. M. Wooster
Atty.

UNITED STATES PATENT OFFICE.

GEORGE S. PEARSON, OF WATERBURY, CONNECTICUT.

LACING HOOK OR STUD FOR SHOES, GLOVES, &c.

SPECIFICATION forming part of Letters Patent No. 525,718, dated September 11, 1894.

Application filed May 7, 1894. Serial No. 510,242. (No model.)

*To all whom it may concern:*

Be it known that I, GEORGE S. PEARSON, a citizen of the United States, residing at Waterbury, in the county of New Haven and State of Connecticut, have invented certain new and useful Improvements in Lacing Hooks or Studs for Shoes, Gloves, &c.; and I do hereby declare the following to be a full, clear, and exact description of the invention, such as will enable others skilled in the art to which it appertains to make and use the same.

My invention has for its object to provide a lacing hook or stud for shoes, gloves, &c., which shall be made from a single blank or strip of wire doubled upon itself and formed to the proper shape thereby producing a hook or stud which shall be neat and attractive in appearance, perfectly strong and durable and capable of being manufactured at a mere fraction of the cost of production of ordinary cast and sheet metal hooks and studs.

With these ends in view I have devised the novel wire lacing hook or stud of which the following description in connection with the accompanying drawings is a specification, numbers and letters being used to designate the several parts.

Figure 1:
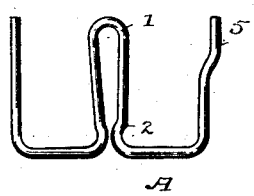
Figure 2:
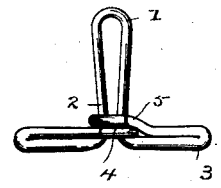
Figure 3:
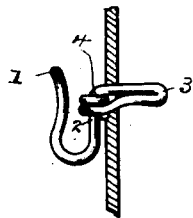
Figure 4:
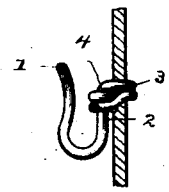

Figures 1 and 2 are elevations illustrating the blank of wire at different steps in the process of forming a completed lacing hook or stud; Fig. 3, a section of a shoe or other article upon which it is desired to place the hook or stud the fastening lugs having been forced through but not clamped down to place; Fig. 4, a similar view showing the fastening lugs clamped to place to hold the hook or stud in position; and Fig. 5 is a plan view of my novel hook or stud in the normal position on a shoe, glove or other article of wearing apparel.

Figure 5:
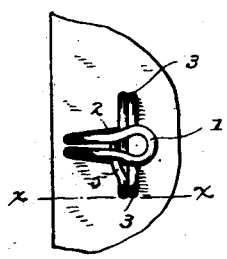

A denotes the blank of wire which in the process of manufacture is doubled upon itself at the center the two halves of the blank ordinarily inclining toward each other slightly so as to make the head of the hook or stud slightly wider than the shank thereof as clearly shown in Fig. 5. 1 denotes the head of the hook or stud, and 2 the shank thereof. It will of course be apparent that the special shape of these parts is not of the essence of my invention. It is deemed sufficient for the purposes of this specification to say that the wire is doubled upon itself and bent to suitable shape to form the head and shank of the hook or stud. The halves of the blank of wire are then bent outward at right angles and then backward upon themselves to form the attaching prongs 3, the ends of the blank or strip of wire being bent around the base of the shank as clearly shown in Fig. 2 thereby securing the ends in place and also constituting the body of the hook or stud which I designate by 4. The purpose of the off set 5 on one end of the blank, shown clearly in Fig. 1, will be apparent from the other figures of the drawings, it being simply off set so as to permit it to lie side by side with the other end of the piece after it has been bent around the base of the shank as clearly shown in Fig. 2. The hook or stud is completed for use by bending the prongs inward at right angles leaving them in position to be passed through the shoe or other garment to which the hook or stud is to be attached, as clearly shown in Fig. 3. The attachment of the hook or stud in place is completed by simply pressing down the ends of the prongs on the under side of the shoe or other garment in the usual manner as is clearly shown in Fig. 5.

Having thus described my invention, I claim—

A lacing hook or stud consisting of a blank of wire doubled upon itself to form a head 1 and shank 2, the halves of the blank being bent outward at right angles then backward upon themselves to form attaching prongs 3, the ends of the blank being bent around the base of the shank to secure them in place and to form a body 4 and the prongs being bent into position to be passed through the shoe or other garment to which the hook or stud is to be attached.

In testimony whereof I affix my signature in presence of two witnesses.

GEORGE S. PEARSON.

Witnesses:
    EDWARD W. BUSH,
    WILLIAM R. MATTISON.